(12) United States Patent
Hobbs

(10) Patent No.: US 7,363,818 B2
(45) Date of Patent: Apr. 29, 2008

(54) PROGRAMMABLE VIBRATOR

(76) Inventor: Gregg K. Hobbs, 4300 W. 100th Ave., Westminster, CO (US) 80031

( * ) Notice: Subject to any disclaimer, the term of this patent is extended or adjusted under 35 U.S.C. 154(b) by 252 days.

(21) Appl. No.: 11/182,525

(22) Filed: Jul. 15, 2005

(65) Prior Publication Data

US 2006/0027023 A1 Feb. 9, 2006

Related U.S. Application Data

(60) Provisional application No. 60/588,614, filed on Jul. 15, 2004.

(51) Int. Cl.
G01M 7/02 (2006.01)
(52) U.S. Cl. .......................... 73/665; 73/662
(58) Field of Classification Search .............. 73/665, 73/662
See application file for complete search history.

(56) References Cited

U.S. PATENT DOCUMENTS

| | | |
|---|---|---|
| 4,164,151 A | 8/1979 | Nolan et al. |
| 4,479,551 A | 10/1984 | Justus |
| 4,735,089 A | 4/1988 | Baker et al. |
| 4,785,431 A | 11/1988 | Myers |
| 5,365,788 A | 11/1994 | Hobbs |
| 5,412,991 A | 5/1995 | Hobbs |
| 5,493,944 A | 2/1996 | Felkins et al. |
| 5,517,857 A | 5/1996 | Hobbs |
| 5,540,109 A | 7/1996 | Hobbs |
| 5,589,637 A | 12/1996 | Hobbs |
| 5,675,098 A | 10/1997 | Hobbs |
| 5,744,724 A | 4/1998 | Hobbs |
| 5,836,202 A | 11/1998 | Hobbs |
| 5,969,256 A | 10/1999 | Hobbs |
| 5,979,242 A | 11/1999 | Hobbs |
| 6,112,596 A | 9/2000 | Hess |
| 6,422,083 B1 | 7/2002 | Hobbs |
| 6,502,464 B1 | 1/2003 | Hobbs |
| 6,721,668 B1 * | 4/2004 | Momoi et al. ............ 73/662 X |
| 2006/0174709 A1 | 8/2006 | Hobbs |

* cited by examiner

*Primary Examiner*—Thomas P. Noland
(74) *Attorney, Agent, or Firm*—Greenlee, Winner and Sullivan P.C.

(57) ABSTRACT

A pneumatic vibrator for generating a series of force impulses whose frequency, duration, magnitude and shape can be statically and dynamically programmed by varying mechanical, pneumatic, or hydraulic parameters or a combination thereof.

35 Claims, 12 Drawing Sheets

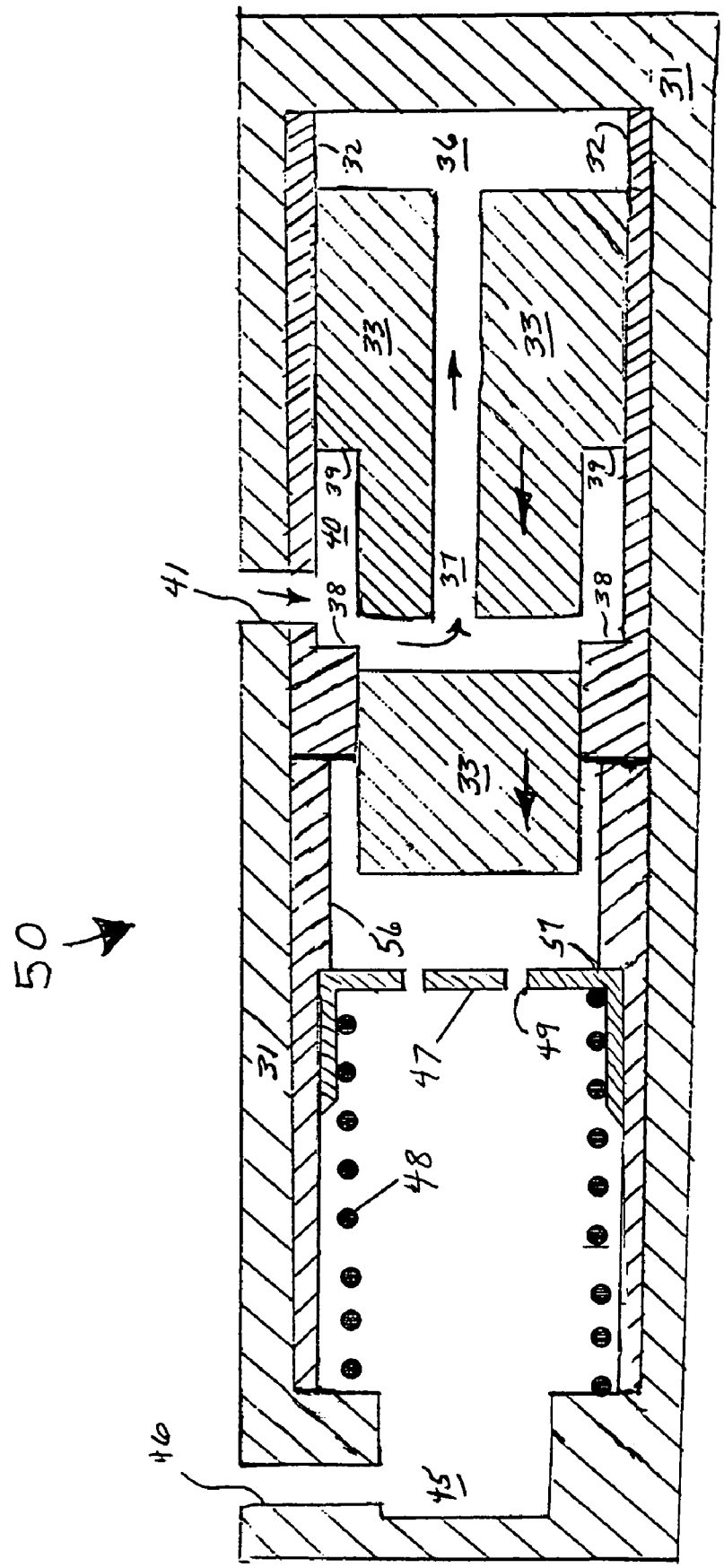

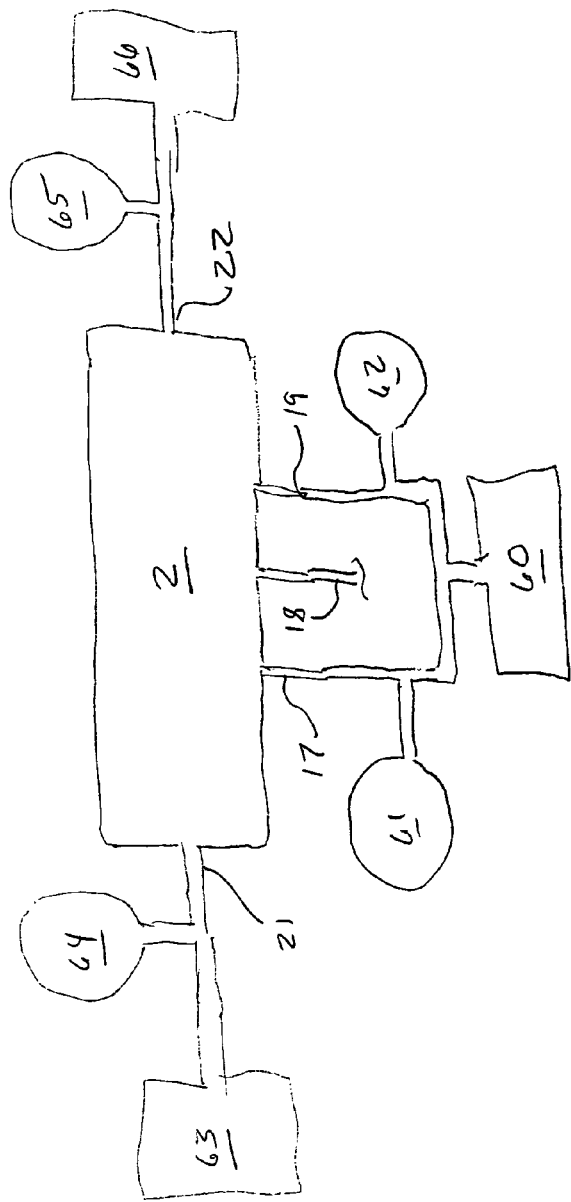
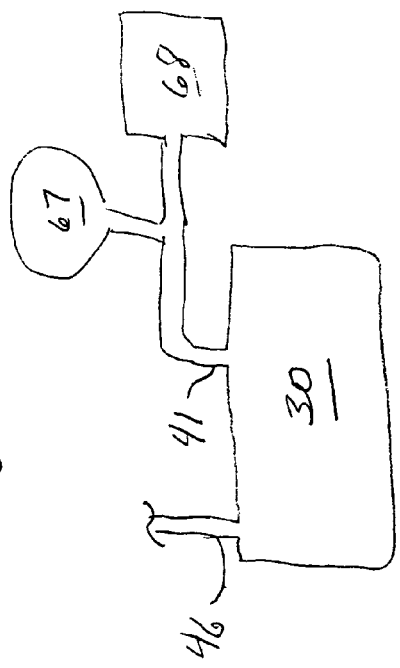
Fig. 7
Fig. 8

PROGRAMMABLE VIBRATOR

CROSS-REFERENCES TO RELATED APPLICATIONS

This application claims the benefit of U.S. Provisional Application No. 60/588,614 filed Jul. 15, 2004, which application is hereby incorporated by reference to the extent not inconsistent with the disclosure herewith.

STATEMENT REGARDING FEDERALLY SPONSORED RESEARCH OR DEVELOPMENT

Not applicable

BACKGROUND OF THE INVENTION

Vibrators of this type are usually attached to shaker tables on which products are mounted for vibration-tolerance testing.

Highly Accelerated Life Testing (HALT) and Highly Accelerated Stress Screening (HASS) applications utilize vibrators to identify product design and process defects by applying overstress conditions during design and manufacturing periods. These processes force failures in shorter times than would occur in the field. The identified design and process weaknesses can then be removed and the testing process can be repeated as necessary until there are no weaknesses that would cause early field failures.

Vibration-tolerance testing is done on many different types, shapes and sizes of products. These different products must be tested with vibrations having different magnitudes, directions and frequency spectra. The products are often tested by simultaneously applying to the product vibrations from multiple vibrators and along multiple axes or directions.

Over the years, many designs of shaker tables and actuators have been developed to test different products. Some have been tailored to one specific type or class of products and others have been designed to adapt to a range of products.

In all these cases, however, it is desirable to have the capability to adjust the characteristics of the vibrations to conform to the requirements of the product and its applications. Various methods have been devised to adjust and control the spectra of the vibrations applied to the products under test.

Most shaker tables use multiple vibrators of the same type and utilize the table characteristics and the mounting and orientation of the vibrators to obtain the desired vibration characteristics. Typically, these vibrators are of the pneumatic type and only permit the alteration of the magnitude and repetition frequency of their impulses by adjusting the air pressure supplied to them.

Some shaker table designs provide the flexibility to test various products with a single table and type of vibrator. For example, U.S. Pat. No. 5,969,256 to Hobbs teaches a modular shaker table having provisions for interchanging modules to alter the coupling of vibrations from the vibrators to the specimen under test. U.S. Pat. No. 6,502,464 to Hobbs and U.S. Pat. No. 4,154,161 to Nolan et al. teach the use of objects bouncing within a container to generate random force impulses from the periodic force impulses provided by a vibrator. U.S. Pat. No. 4,735,089 to Baker et al. teaches the use of a flexure member to provide damping of the vibrations.

Several types of vibrators have been devised for use in vibration testing. For example, U.S. Pat. No. 5,412,991 to Hobbs teaches a vibrator having a piston and sleeve with curvilinear surfaces which randomly vary the stroke length and reciprocation frequency of the piston. U.S. Pat. No. 5,493,944 to Felkins et al. teaches an actuator having a piston in a cylinder and a programmer which randomly bounces between the piston and the impact end of the cylinder thereby producing multiple random impacts during each cycle of the piston.

In the field of hydraulic hammers of the type used to break up concrete, street pavement and the like, U.S. Pat. No. 4,479,551 to Justus teaches an actuator for a hydraulic ram which utilizes a chamber containing oil to prevent metal fatigue due to metal-to-metal contact of impacting components.

However, in addition to an alterable shaker table and a vibrator which only permits adjustment of the frequency and magnitude of its force impulses, a vibrator in which the shape and frequency spectrum of its force impulses can be statically and dynamically controlled is also desirable.

It is therefore an object of this invention to provide a programmable vibrator which provides for static and dynamic adjustment of the temporal shape of a force impulse applied to a product either directly or indirectly through a shaker table. As is well known in the art, the shape of an impulse in the time domain is equivalent to a spectrum of frequencies in the frequency domain as described mathematically by the Fourier transform.

SUMMARY OF THE INVENTION

The invention is a programmable pneumatic vibrator for generating a series of force impulses whose frequency, duration, magnitude and shape can be statically and dynamically controlled, or programmed, by varying mechanical, pneumatic or hydraulic parameters or a combination thereof.

As used herein, the following terms are defined:

The term "statically" programmable refers to modification of physical structures typically, but not limited to, when a vibrator is not in use.

The term "dynamically" programmable refers to modification of non-structural elements (such as the composition, pressure or volume of a fluid or gas) typically, but not limited to, when a vibrator is in use.

A force impulse is defined as a force having a large magnitude and a short duration in time.

The shape of an impulse is defined as the profile of its instantaneous magnitude plotted against time.

The shape of a force in time can also be represented by a profile of magnitudes of frequencies, i.e., by a frequency spectrum. Therefore, an impulse can be represented either by a shape of its profile in the time domain or by a profile in the frequency domain. The Fourier Transform provides for mathematically transforming a shape in the time domain into a frequency spectrum and vice-versa. By controlling, or programming, the shape of a force impulse in the time domain, a spectrum of forces in the frequency domain can be produced which include vibrations at desired frequencies and magnitudes. These frequencies can then be used to excite or suppress natural resonances and sensitivities to particular frequencies in products being tested. A comprehensive description of the concepts of shock and vibration is presented in Cyril M. Harris and Charles E. Crede: Shock and Vibration Handbook, 2d ed., McGraw-Hill Book Company, 1976, ISBN 0-07-026799-5, incorporated herein by reference. Also, a description of the Fourier transform can be found in Athanasios Papoulis: The Fourier Integral and its Applications, McGraw-Hill Book Company, Inc., 1962, also incorporated herein by reference.

The vibrators of this invention are capable of free-running in that they can operate without external control when connected to a supply of fluid such as a compressed gas. However, the frequency, duration, magnitude, and shape of the impulses can be dynamically altered by varying the pressure and flow of fluids to the vibrator.

The vibrators of the invention all use a reciprocating piston which impacts a programmer device. The force impulse produced by the impact is transferred through the programmer device to the vibrator housing which in turn applies the force impulse to a load such as a shaker table or a product under test. The programmer device can comprise a piston, a spring, a hydraulic or pneumatic cylinder, a block of resilient material or a combination thereof. The programmer device provides the impact absorption characteristics necessary to produce a desired impulse shape.

Multiple vibrators of the invention can be attached with different orientations to a shaker table to provide multi-axial vibrations of the table. Exemplary arrangements and associated hardware for attaching vibrators to a shaker table are shown in FIGS. 9-10 and 15-17 of U.S. Pat. No. 5,365,788 and in FIGS. 11-12 of U.S. Pat. No. 5,969,256, both patents incorporated herein by reference.

A first embodiment of the vibrator comprises a housing having a cylinder, closed at both ends, containing at least two slidable pistons and having a number of ports for connecting segments of the cylinder to one or more sources of pressurized fluid. The two pistons comprise a driver piston and a programmer piston which separate the cylinder into three chambers: a thrust chamber at each end of the driver piston and a programmer chamber between the programmer piston and a closed end of the cylinder. The thrust chambers are provided with intake and exhaust ports so located that when pressure is applied to the intake ports, the driver piston reciprocates within the cylinder and impacts the programmer piston preferably every cycle. The programmer chamber is filled via a programmer port with a fluid during the time interval between impacts. When the driver piston impacts the programmer piston, the fluid in the programmer chamber aids in shaping the force impulse applied to the housing. The impulse shape depends on statically variable parameters such as the volume of the programmer chamber, the mass of the driver and programmer pistons, the materials used in the programmer and driver pistons, and the size and shape of the programmer port. The impulse shape also depends on dynamically variable parameters such as the pressure, viscosity, compressibility and volume of the fluid in the programmer chamber as well as the pressure of the gas supplied to the driver chambers. These variable programmer parameters provide dynamic control of the magnitude, duration and shape of the force impulse applied to the vibrator housing. At each impact, the vibrator couples a force impulse through its housing to the product under test either directly or indirectly through a shaker table.

A second embodiment of the invention comprises one driver piston and two programmer pistons, one programmer piston on each side of the driver piston, forming two programmer chambers. In this embodiment, the driver piston impacts both programmer pistons every cycle thereby providing two impulses per cycle of the driver piston. In addition to doubling the impact repetition rate, this embodiment provides for using different parameters in each programmer chamber and programmer piston thereby producing two impulse shapes from one vibrator.

To allow further control of impulse shape, the programmer pistons may comprise various elastic materials, including springs, or resilient materials such as elastomers, plastics and rubber compositions instead of the usual metals.

A third embodiment comprises placing a spring in the programmer chamber of the first embodiment or a spring in one or both of the programmer chambers of the second embodiment. When two springs are used, they can have the same or different characteristics as needed to obtain the desired impulse shapes.

A fourth embodiment comprises a vibrator using a programmer block made of a solid resilient material instead of the programmer pistons of the previously summarized embodiments. The programmer block of this embodiment contains cooling passages running through its interior and exhaust gas from the driver piston is channeled through the cooling passages. A cooling system is desirable because, without it, the repeated impacts by the driver piston on a resilient material can generate enough heat to alter the characteristics of, or permanently damage, the material.

The invention is further described in the Drawings and Detailed Description that follows.

The invention further comprises methods for generating and shaping a series of force impulses which comprise selection and/or variation of one or more geometric parameters or other parameters or properties of the vibrators, gasses supplied, or fluids supplied to the vibrators.

BRIEF DESCRIPTION OF THE DRAWING

FIG. 4C shows a fifth embodiment with the driver piston in a first position.

FIGS. 7-8 show exemplary fluid supplies and port connections to a vibrator.

DETAILED DESCRIPTION OF THE INVENTION

Figure 1:
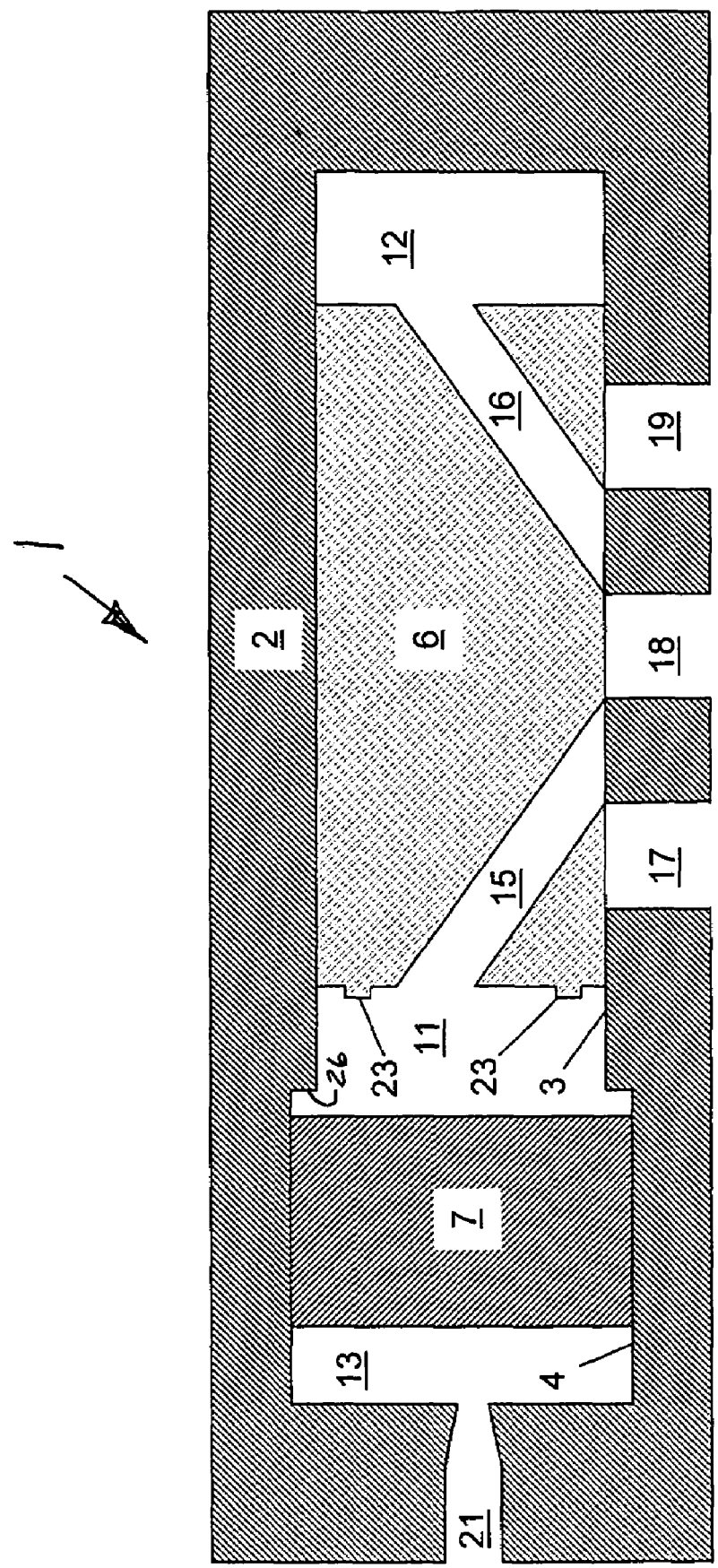
FIG. 1 is a cross-sectional view of a first embodiment of the invention.

The invention is illustrated in the drawings in which like numbers represent the features.

A first embodiment of the invention is shown in FIG. 1. The vibrator 1 comprises a housing 2 containing two cylinders: driver cylinder 3 and programmer cylinder 4. Cylinder 3 contains a driver piston 6. Cylinder 4 is slightly larger in diameter than cylinder 3 and contains a programmer piston 7. The non-adjacent ends of cylinders 3 and 4 are closed (except for a port 21 in the end of cylinder 4). Housing 2 contains a first thrust chamber 12 enclosed by cylinder 3, driver piston 6 and the closed end of cylinder 3 and a second thrust chamber 11 enclosed by cylinder 3 (and can include a segment of cylinder 4), driver piston 6 and programmer piston 7. Also, housing 2 contains a programmer chamber 13 enclosed by cylinder 4, programmer piston 7 and the closed end of cylinder 4. The housing further comprises three ports, each providing a passage from outside the housing into cylinder 3: a first inlet port 17, an exhaust port 18, and a second inlet port 19. The driver piston comprises two ports: a first driver port 15, providing a passage from chamber 11 to a first opening on the cylindrical surface of the driver piston, and a second driver port 16, providing a passage from chamber 12 to a second opening on the cylindrical surface of the driver piston. Driver ports 15 and 16 are located such that they are capable of aligning with ports 17 and 18, respectively, when piston 6 is nearer cylinder 4 and are capable of aligning with ports 18 and 19, respectively, when piston 6 is nearer the closed end of cylinder 3. The housing also comprises a programmer port 21, which provides a passage from outside the housing through the closed end of cylinder 4 and into the programmer chamber 13. The driver piston may comprise one or more impact protrusions 23 which contact the programmer piston on impact. The junction of cylinders 3 and 4 provides a stop 26 for the programmer piston.

Figure 1A:
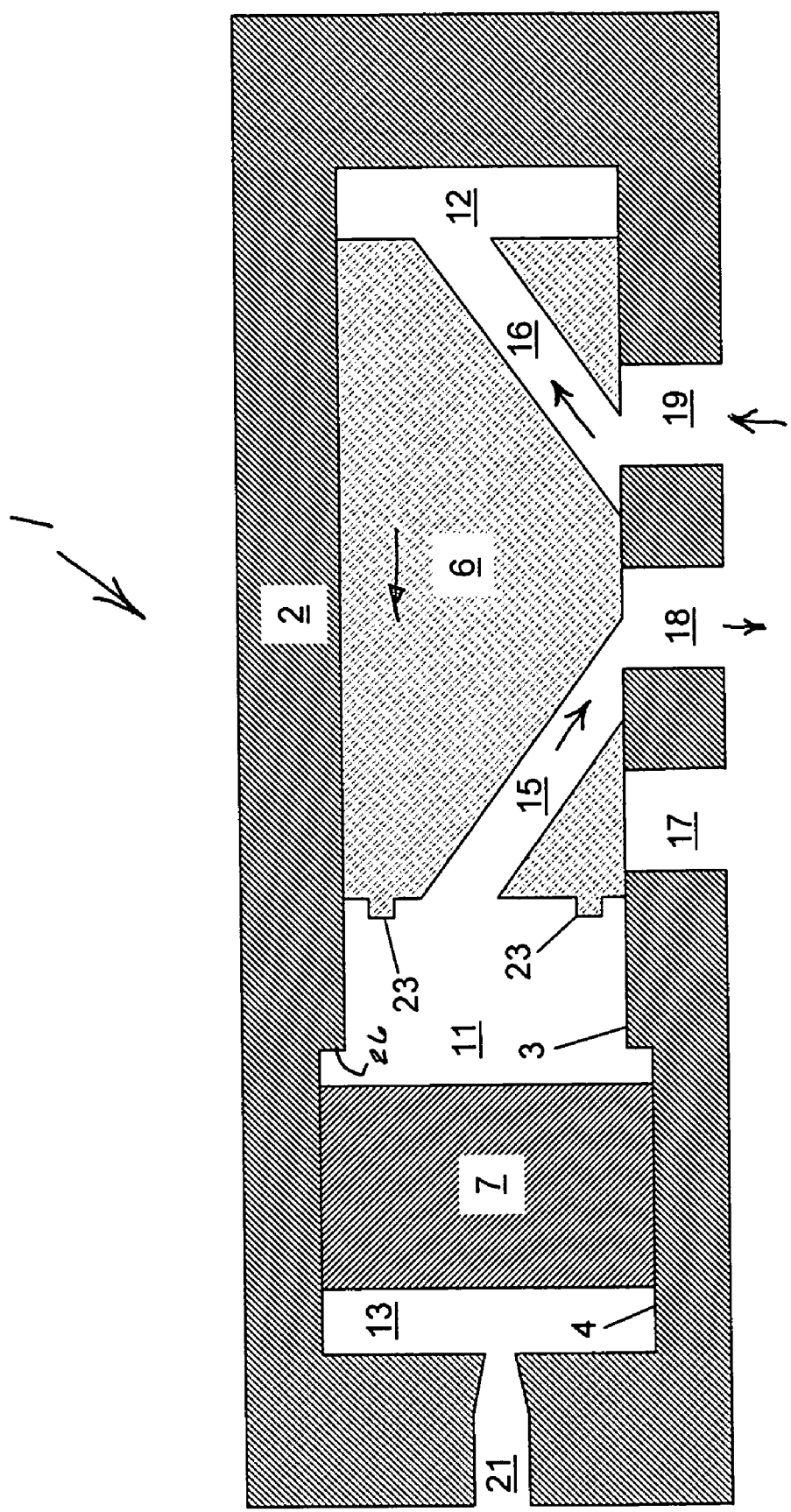
FIG. 1A is a view of the first embodiment with the driver piston in a first position.
Figure 1B:
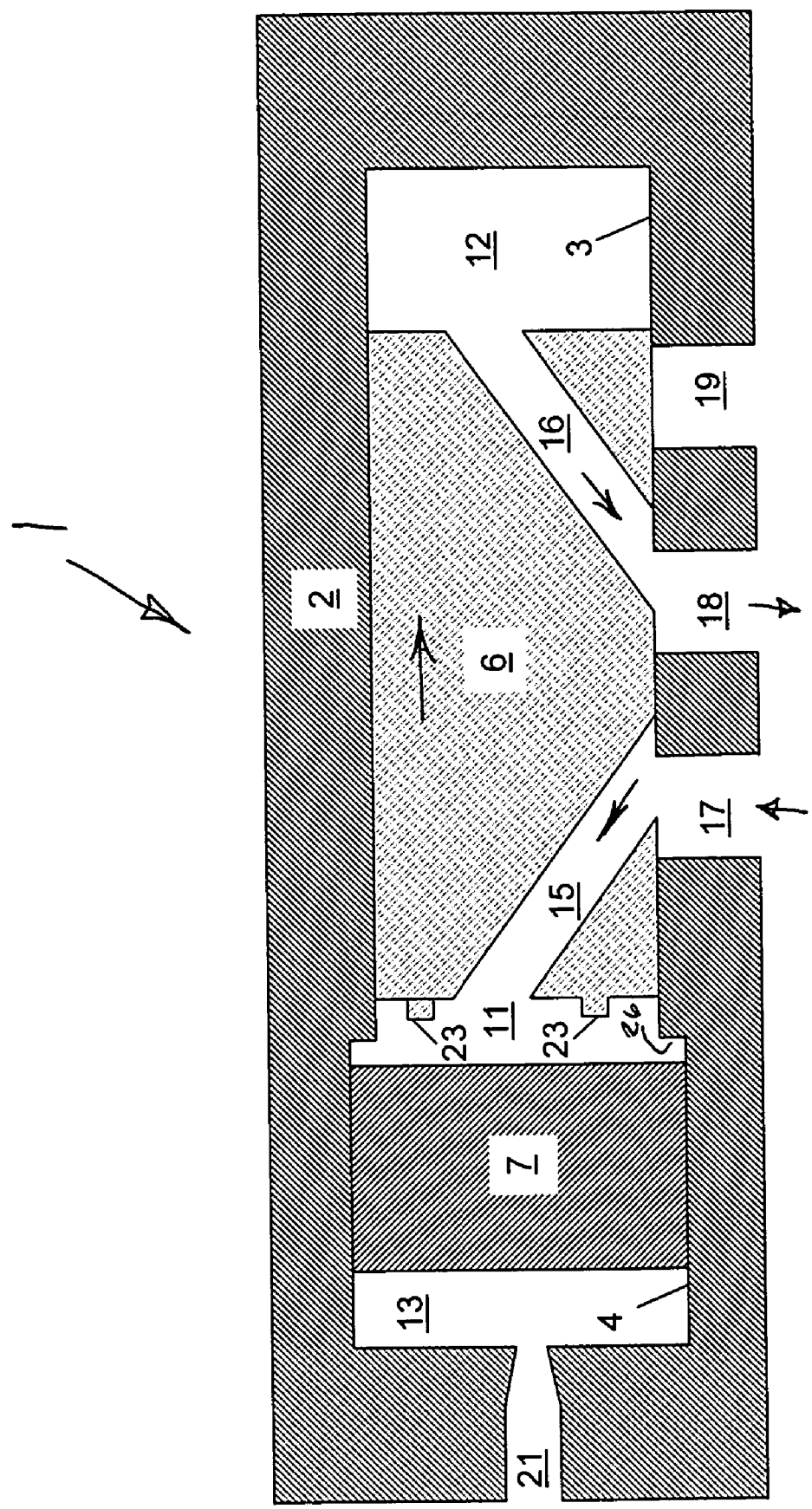
FIG. 1B is a view of the first embodiment with the driver piston in a second position.

In operation, referring to FIG. 1A, with the driver piston near the closed end of cylinder 3, ports 16 and 19 are aligned and the driver piston is pushed toward cylinder 4 by pressurized gas flowing from an external source (not shown) through ports 19 and 16 and into the thrust chamber. Ports 15 and 18 are aligned at this time thereby relieving any opposing pressure in chamber 11. As the driver piston moves toward cylinder 4, ports 15 and 18 and ports 16 and 19 eventually become misaligned thereby blocking gas flow through ports 15 and 16. At this time, the driver piston continues to accelerate due to the residual pressure in the thrust chamber. As the driver piston approaches cylinder 4, port 16 becomes aligned with port 18 thereby relieving the pressure in chamber 12. At this time, the driver piston ceases to accelerate and continues on to impact programmer piston 7. Eventually port 15 becomes aligned with port 17 thereby allowing pressurized gas to enter chamber 11. The pressure in chamber 11 causes the driver piston to accelerate in the opposite direction thereby reversing the motion of the piston. Then, referring to FIG. 1B, the reverse of the previously described process occurs and the driver piston returns its starting point. This cycle repeats while pressure is applied to ports 17 and 19.

When the driver piston 6 is away from the programmer piston 7, the programmer chamber 13 fills with programmer fluid according to the pressure and viscosity of the fluid and the cross sectional area and shape of the programmer port 21. The range of travel of the programmer piston 7 toward the driver piston 6 is restricted by programmer stop 26.

The parameters affecting driver piston velocity at impact include the area and mass of the piston, the shape and area of the inlet ports, and the dynamic inlet and exhaust pressures. When the driver piston has traveled far enough to align the exhaust ports, the pressure pushing the driver piston is vented through the exhaust ports. These ports may include internal or external orifices and accumulators to control the rate of pressure drop.

Upon driver piston impact, the programmer piston will acquire a velocity profile depending on the velocity of the driver piston, the mass and elasticity of the driver and programmer pistons, the viscosity, volume and compressibility of the fluid in the programmer chamber as well as the size of the chamber and the shape and size of the programmer port. The programmer port can be conical in shape with a smaller diameter on the inside and a larger diameter on the outside so that fluid will flow much more readily into, rather than out of, the programmer chamber. An accumulator can be placed on the programmer port to control the fluid flow from the programmer chamber.

The shape of the force impulse coupled to the housing of the vibrator depends on the decelerations and resulting velocity profiles of the driver and programmer pistons. The parameters identified in the preceding two paragraphs can be selected to determine these profiles and thereby the shape of the force impulse.

The duration of the impulse controls the total bandwidth of the shaker. The force or momentum transferred controls the overall acceleration or vibration level generated on the shaker. The force pulse shape determines the vibration spectrum generated on the shaker (i.e., the impulses generate a series of lines in the frequency domain). The total duration of the impulse determines the number of lines generated (i.e., the bandwidth of the vibration) and the shape of the pulse determines the magnitudes of the lines. The repetition rate determines the distance between lines (i.e., the spacing in the frequency domain). Any of the ports can be restricted in some modulated fashion to modify the behavior of the vibrator in any of the above mentioned ways, that is, to selectively control the repetition rate, impact duration, impact force amplitude or bandwidth of the resulting vibration.

A combination of different vibrators, or similar vibrators with different programming, can be utilized on a shaker table to allow further customizing of the vibration to the product under test. For example, one vibrator can be programmed for a broad bandwidth and another for a narrow bandwidth. In addition, the repetition rate (cyclic rate) can be varied to fill in the gaps in the spectra which would occur if all vibrators had the same cyclic rate. A shaker table, or a product being vibrated, can also introduce variations in the spectra. A flexible shaker table may have any number of axes of vibration although a truly rigid table can have only three linear axes and three rotational axes. However, the vibration vectors and associated spectra from many vibrators can be combined to provide vibration along fewer axes.

The fluids that can be used in the chambers include air, nitrogen and various oils. Preferably, the fluid used in the thrust chambers is a compressible gas. The programmer chamber can contain a fluid which is different from that in the other chambers. For example, the programmer chamber can be filled with a lubricating oil and the other chambers filled with low viscosity compressible fluids such as air or nitrogen. Preventing or minimizing wear is a preferred design feature of the vibrator. The use of oil in the programmer chamber is desirable to lubricate the entire vibrator because oil will naturally leak past the programmer piston and enter the area swept by the driver piston. Any oil exiting the exhaust port can be collected and recycled for both economy and cleanliness. Circumferential grooves, not shown, can be provided around the programmer piston and/or the driver piston to limit oil leakage and to collect debris.

Programmer port 21 can have a conical section tapered to create unequal flow resistance in the two directions by gradually decreasing the diameter of a port in one direction and then abruptly increasing the diameter in the same direction. The flow is somewhat reduced by the taper when flowing in the direction of the decreasing diameter, but is significantly restricted when flowing in the opposite direction and encountering an abrupt decrease in diameter. Alternatively, the flow can be diverted through different flow paths when entering or exciting the ports. For example, to obtain complete filling of the programmer chamber, fluid could flow freely into the programmer port from a large accumulator and then flow out through a restriction of some kind such as a different path through a one-way valve or a non-linear restriction to regulate the pressure against the programmer piston and to shape the impulse generated.

An accumulator is defined herein as a container, for storing fluid, having a very low restriction path to a port and having a volume which affects how much fluid can quickly flow though the port. Without an accumulator, fluid supply line pressure can drop rapidly as flow increases. With an accumulator, the flow can be held at a higher rate for a short duration of time which depends on the flow restriction and the accumulator volume and initial pressure. Accumulators can have different sizes and shapes and can have one-way inlet and outlet valves as necessary to provide the desired fluid flow characteristics. Accumulators can also have an internal flexible membrane to separate the interior into two chambers. For example, an accumulator can have oil in one chamber which is coupled to a port and air in the other chamber which is closed. Such an accumulator permits the oil to act is if it were compressible and absorbs the pressure shocks of abrupt changes in oil flow as well as allowing for thermal expansion of the oil. In this way, with appropriate inlet and outlet restrictions and valves, the accumulator can also function as a spring-mass-damper device to help shape the impulses. Various sizes and types of accumulators can be chosen and coupled to any of the inlet, outlet or programmer ports as necessary to obtain the desired performance of the vibrator.

Two or more vibrators can be supplied from the same accumulator. If the vibrators are asynchronous, the accumulator pressure when the inlet port to each thrust chamber is opened will be irregular and the repetition rates of the vibrators will vary. Therefore, the magnitudes and the spectra of the vibrators will also vary. The same approach can be used on other inlet/outlets to vary the vibrator output spectra with time.

Multiple accumulators can be coupled together through a pipe, with or without a restriction in it, such that the accumulators' pressures vary with time, further varying the vibrator's output spectra.

Other programming techniques include the use of throttles, valves (including one-way valves), or tapered ports on the inlet and exhaust ports.

The programmer piston design contributes to the shape of the impulse generated when the driver piston impacts the programmer piston. The programmer piston can be a metal, a plastic or an elastomer as necessary to shape the vibration spectra. Various fluids such as air, nitrogen or oil can be used in the programmer chamber. Alternatively, the programmer piston itself can be replaced by a fluid. That is, the driver piston can be stopped by fluid pressure alone without the use of a programmer piston. In this case, a membrane to separate the thrust chamber from the programmer chamber can be used to prevent loss of programmer fluid through the programmer exhaust port. Also, the programmer port can be equipped with a one-way valve to limit, or prevent, escape of fluid through that port.

In yet another alternative, the programmer chamber can contain only the programmer piston with no fluid at all. In this case the size, shape, elastic and damping properties of the programmer piston provide the shaping of the impulse instead of the fluids. These parameters can be chosen to provide the desired shape of the force impulse.

When there is substantial semi-elastic deformation of the programmer piston by the impacts, sufficient heat can be produced to damage or shorten the life of the programmer piston. Cooling of the programmer pistons can be improved by circulating the oil in the programmer chamber through an external oil cooler. This can be done using the previously described programmer port or by adding other ports with appropriate valves. In a case where there is no oil in the programmer chamber, exhaust gas from the thrust chambers can be routed through channels or capillaries in the programmer piston.

General cooling of the vibrator itself can be improved by cooling the pneumatic fluid supply to the thrust chambers. This can be done by the use of heat exchangers between the gas source and the inlet ports or by injecting extremely cold gas into the fluid supply. For example, the cold gas can be nitrogen immediately after it is evaporated from a liquid nitrogen supply. The injection process can be thermostatically controlled to minimize the cost of the cold gas.

The driver and programmer pistons can have one, two or more concentric stepped diameters and the associated cylinders can have corresponding multiple diameters. In this way, the same pressure on opposite ends of a piston can produce different forces, or conversely, different pressures can produce the same force, etc. That is, pressure acting on different surface area components normal to the axis of a piston can produce different forces and different accelerations. These surfaces can be the entire ends of a piston or annular surfaces between larger and smaller piston diameters.

Circumferential grooves (not shown) can be formed in the programmer and driver pistons to limit leakage flow between the pistons and the cylinders. These grooves also function as debris collectors since debris tends to accumulate in the grooves and can be cleaned out during maintenance.

The housing can transfer the shock pulse directly to the product under test or indirectly through a vibration table. The housing may comprise the cylinders themselves or slide-in cylinders may be utilized as the cylinders.

Figure 2:
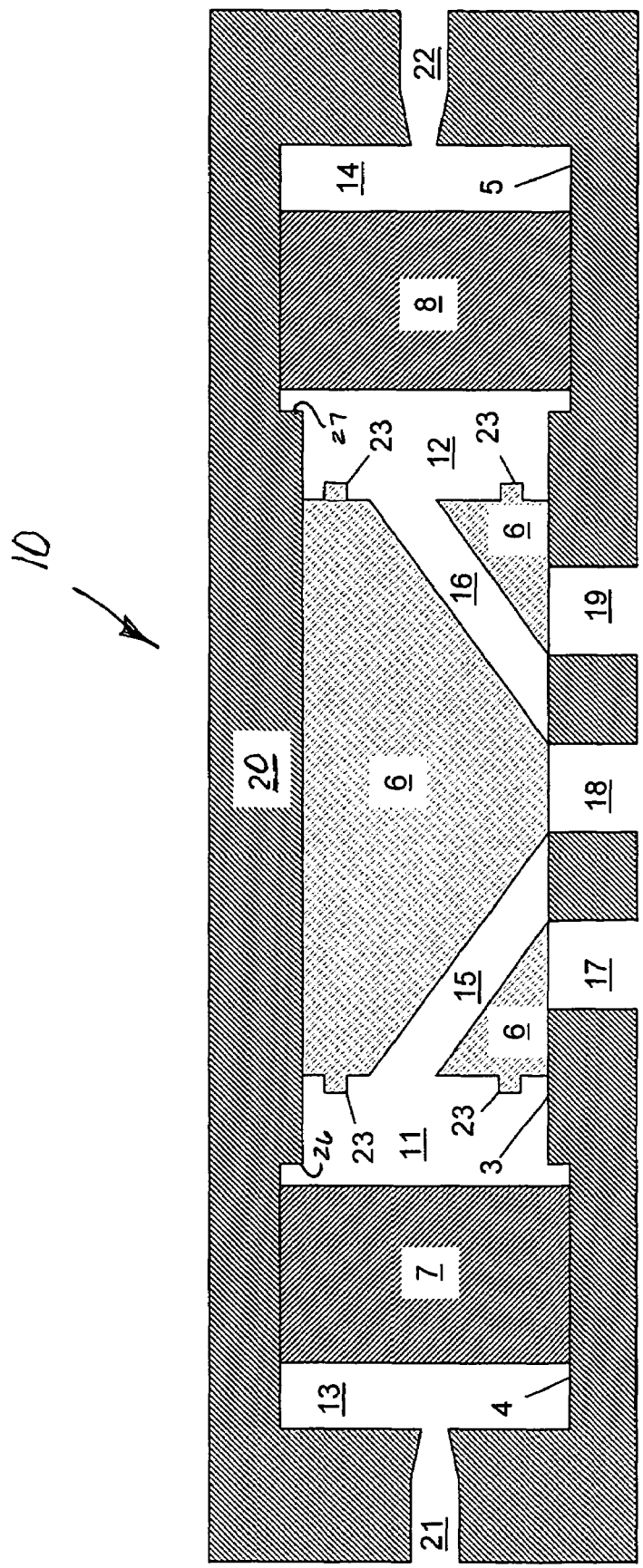
FIG. 2 is a cross-sectional view of a second embodiment of the invention.

A second embodiment of the invention is shown in FIG. 2. This embodiment is similar to the first embodiment except for having two programmer chambers and providing two impulses per cycle of the driver piston. In the following description, the same reference numerals are used for the same elements in the first and second embodiments.

In the second embodiment, vibrator 10 comprises a housing 20 containing three cylinders: driver cylinder 3, first programmer cylinder 4 and second programmer cylinder 5. Cylinder 3 contains a driver piston 6. Cylinders 4 and 5 are slightly larger in diameter than cylinder 3 and contain first and second programmer pistons 7 and 8 respectively. The ends of cylinders 4 and 5 opposite cylinder 3 are closed (except for ports 21 and 22). Housing 2 contains two thrust chambers: a first thrust chamber 11 enclosed by cylinders 3 and 4, driver piston 6 and programmer piston 7 and a second thrust chamber 12 enclosed by cylinders 3 and 5, driver piston 6 and programmer piston 8. Also, housing 20 contains two programmer chambers: a first programmer chamber 13 enclosed by cylinder 4, programmer piston 7 and the closed end of cylinder 4 and a second programmer chamber 14 enclosed by cylinder 5, programmer piston 8 and the closed end of cylinder 5. The housing further comprises three ports, each providing a passage from outside the housing into cylinder 3: a first inlet port 17, an exhaust port 18, and a second inlet port 19. The driver piston comprises two ports: a first driver port 15, providing a passage from chamber 11 to a first point on the cylindrical surface of the driver piston, and a second driver port 16, providing a passage from chamber 12 to a second point on the cylindrical surface of the driver piston. Driver ports 15 and 16 are located such that they are capable of aligning with ports 17 and 18, respectively, when piston 6 is nearer cylinder 4 and are capable of aligning with ports 18 and 19, respectively, when piston 6 is nearer cylinder 5. The housing also comprises two programmer ports: a first programmer port 21, providing a passage from outside the housing through the closed end of cylinder 4 into the first programmer chamber 13, and a second programmer port 22, providing a passage from outside the housing through the closed end of cylinder 5 into the second programmer chamber 14. The driver piston may comprise one or more impact protrusions 23 which contact the programmer pistons on impact. Programmer piston stops 26 and 27 are provided by the different diameters of cylinder 3 and cylinders 4 and 5 respectively.

Figure 2A:
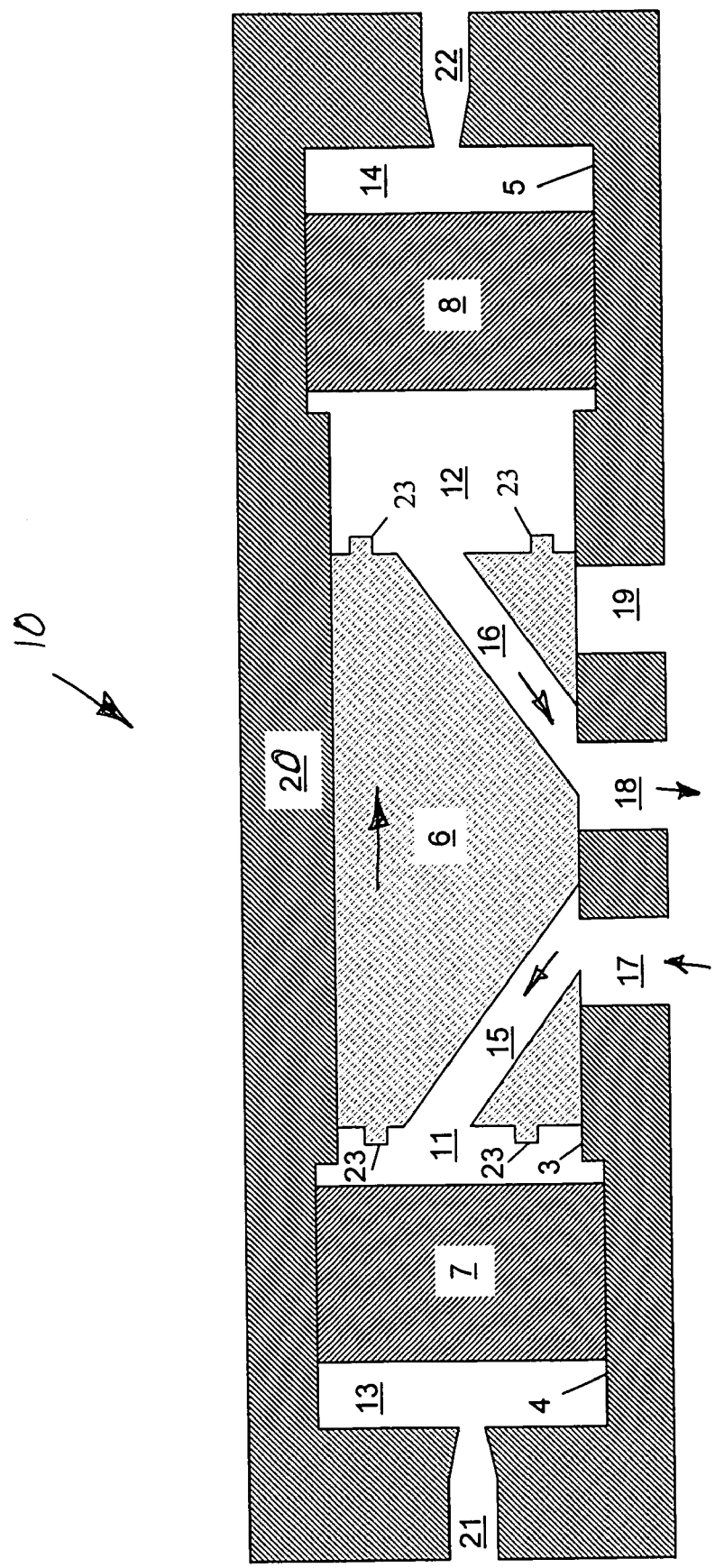
FIG. 2A shows the second embodiment with the driver piston in a first position.

In operation, referring to FIG. 2A, with the driver piston near cylinder 4, ports 15 and 17 are aligned and the driver piston is pushed toward cylinder 5 by pressurized gas flowing from an external source (not shown) through ports 15 and 17 and into the first thrust chamber. Ports 16 and 18 are aligned at this time thereby relieving any opposing pressure in chamber 12. As the driver piston moves away from cylinder 4, ports 15 and 17 and ports 16 and 18 eventually become misaligned thereby blocking gas flow through ports 15 and 16. At this time, the driver piston continues to accelerate due to the residual pressure in the first thrust chamber. As the driver piston approaches cylinder 5, port 15 becomes aligned with port 18 thereby relieving the pressure in chamber 11. At this time, the driver piston ceases to accelerate and continues on to impact programmer piston 7. Port 16 eventually becomes aligned with port 19 thereby allowing pressurized gas to enter chamber 12. Subsequently, the pressure in chamber 12 causes the driver piston to accelerate in the opposite direction thereby reversing the motion of the piston. Then, referring to FIG. 2B, the mirror image of the previously described process occurs and the driver piston 6 returns toward its starting point and impacts programmer piston 8. This cycle repeats while pressure is applied to ports 17 and 19.

The vibrators as depicted in FIGS. 1 and 2 may sometimes fail to start if the driver piston happens to stop with all the inlet ports closed. However, if the vibrator is mounted with the cylinder not horizontal, the driver piston will tend to stop near the lower end of the cylinder with the inlet ports open. If the orientation of the cylinder is insufficient to ensure starting, the driver piston can be biased toward one end of its travel by a spring or by a small fluid bypass channel around one end of the driver piston to ensure that the vibrator will start under all operating conditions.

Figure 3:
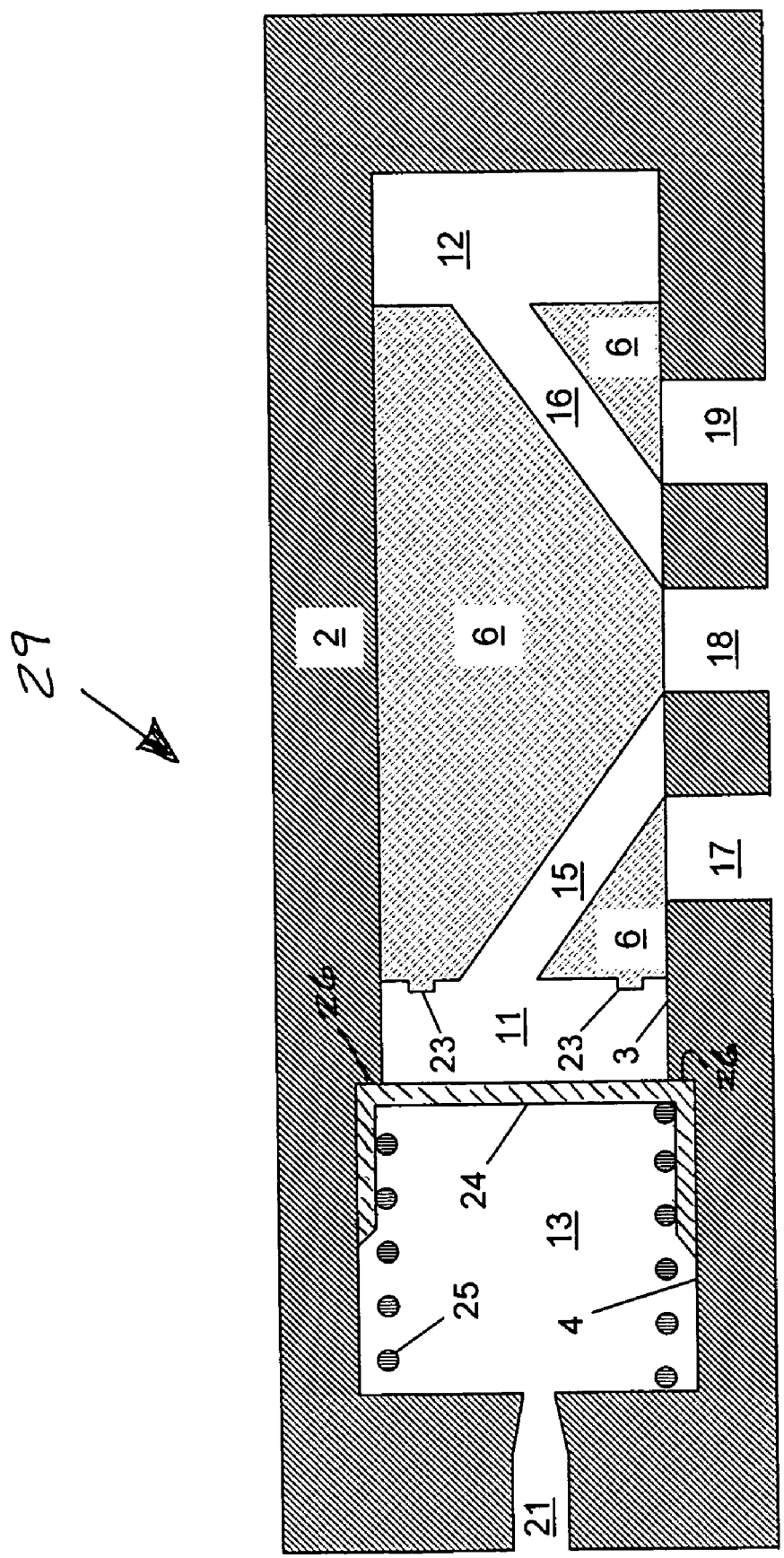
FIG. 3 is a cross-sectional view of a third embodiment of the invention.

A third embodiment 29 of the invention is shown in FIG. 3. In this embodiment, the programmer piston 7 of FIG. 1 is replaced by a cup-shaped piston 24 and a coil spring 25 is contained within programmer chamber 13. One end of the spring is enclosed within cup 24 and the opposite end of the spring rests against the closed end of programmer chamber 13. In the quiescent state, the spring applies an axial force against the inside of piston 24 and presses the closed end of piston 24 against the step in diameter 26 between the larger programmer cylinder 4 and the smaller driver cylinder 3.

As one of ordinary skill in the art will recognize, piston 24 can have shapes other than a cup. For example, piston 24 can be a simple cylinder and spring 25 can be located radially within cylinder 4 by an appropriate choice of its diameter. Also, for example, cylinder 24 can be a cylinder having a short, smaller-diameter protrusion on its end for fitting within the inner diameter of spring 25 to radially locate the movable end of the spring.

In operation, when the driver piston impacts the programmer piston, the shape of the resulting force impulse applied to the housing is affected by the mass of the driver and programmer pistons, the stiffness and length, or preload, of the spring and the size and shape of port 21. The shape is also affected by the volume, pressure, viscosity, and compressibility of the fluid in programmer and thrust chambers.

Figure 2B:
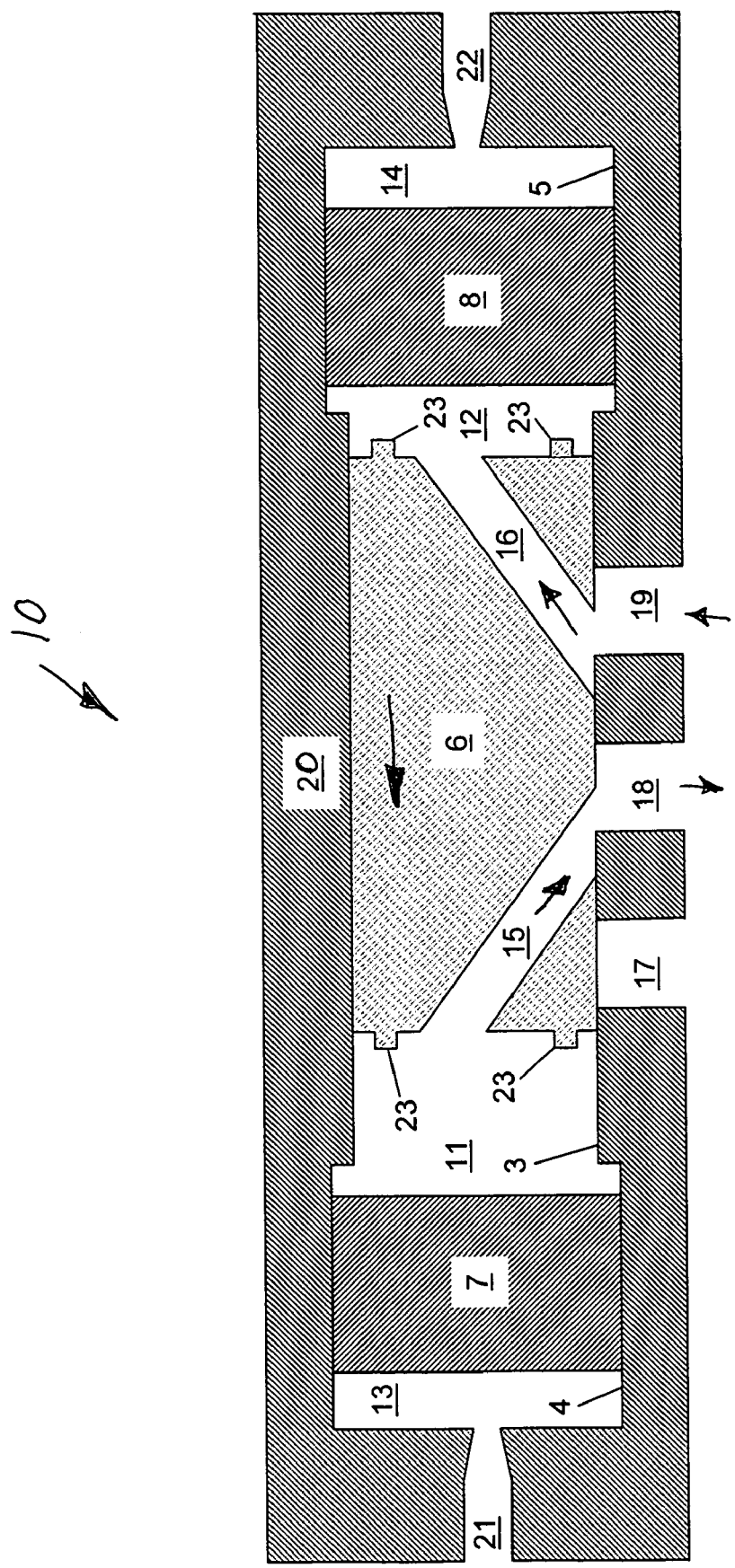
FIG. 2B shows the second embodiment with the driver piston in a second position.

Both programmer pistons 7 and 8 of FIGS. 2A-C can be replaced by a cup and spring as used in the third embodiment to obtain two impacts per cycle of the driver piston as described in the second embodiment.

In each of the previously described embodiments, the shape of the force impulse can be programmed statically by adjusting the piston, spring (if used) and port parameters and dynamically by adjusting the parameters of the fluids in the programmer and thrust chambers. The ability to adjust spring, mass and damping parameters, statically and dynamically in combination, provides a wide variety of impulse shapes and resulting frequency distributions. The vibrator can be initially programmed mechanically (statically) to approximate a desired frequency profile and then programmed in operation (dynamically) to obtain precisely the desired profile. This permits programming a vibrator to excite, or suppress, a particular elusive resonance in a product being tested.

Figure 4A:
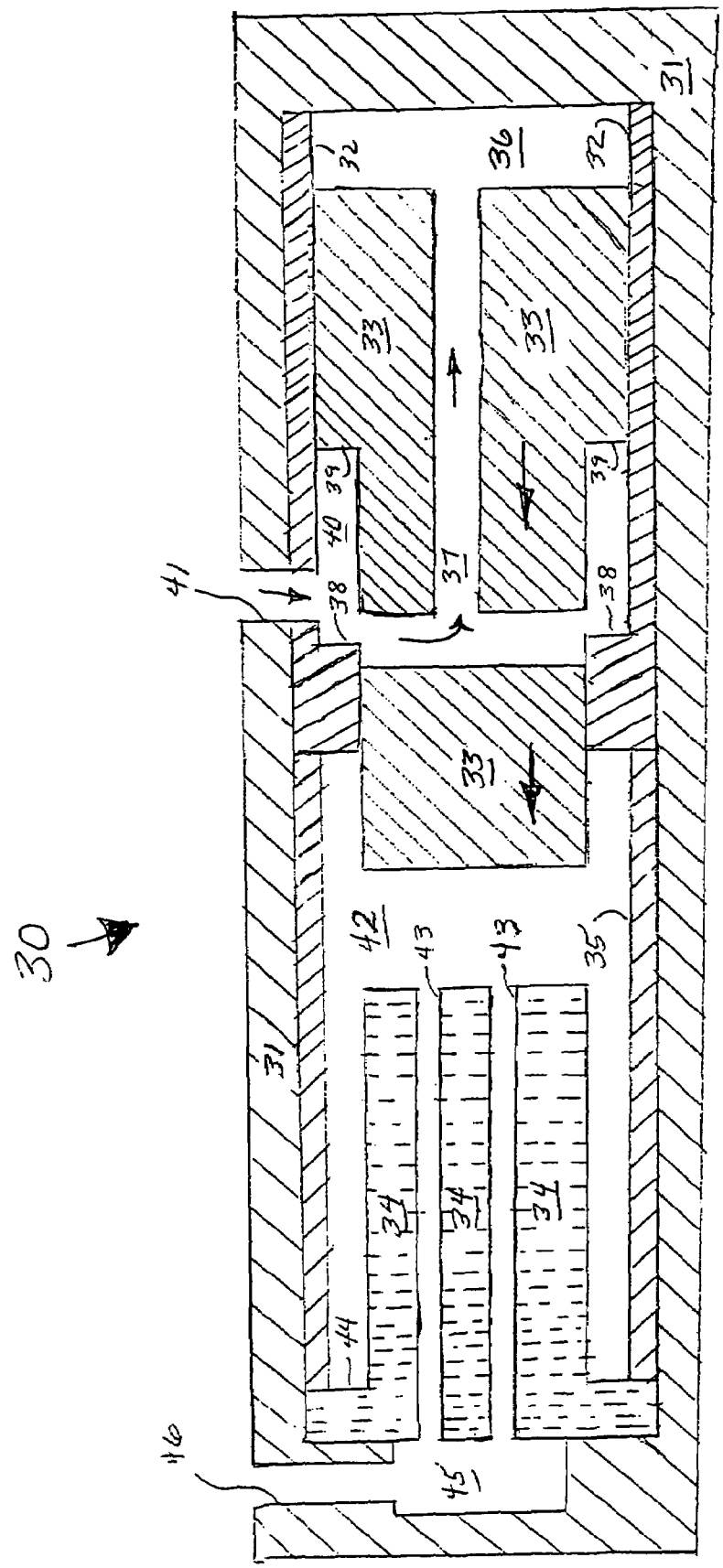
FIG. 4A shows a fourth embodiment with the driver piston in a first position.
Figure 4B:
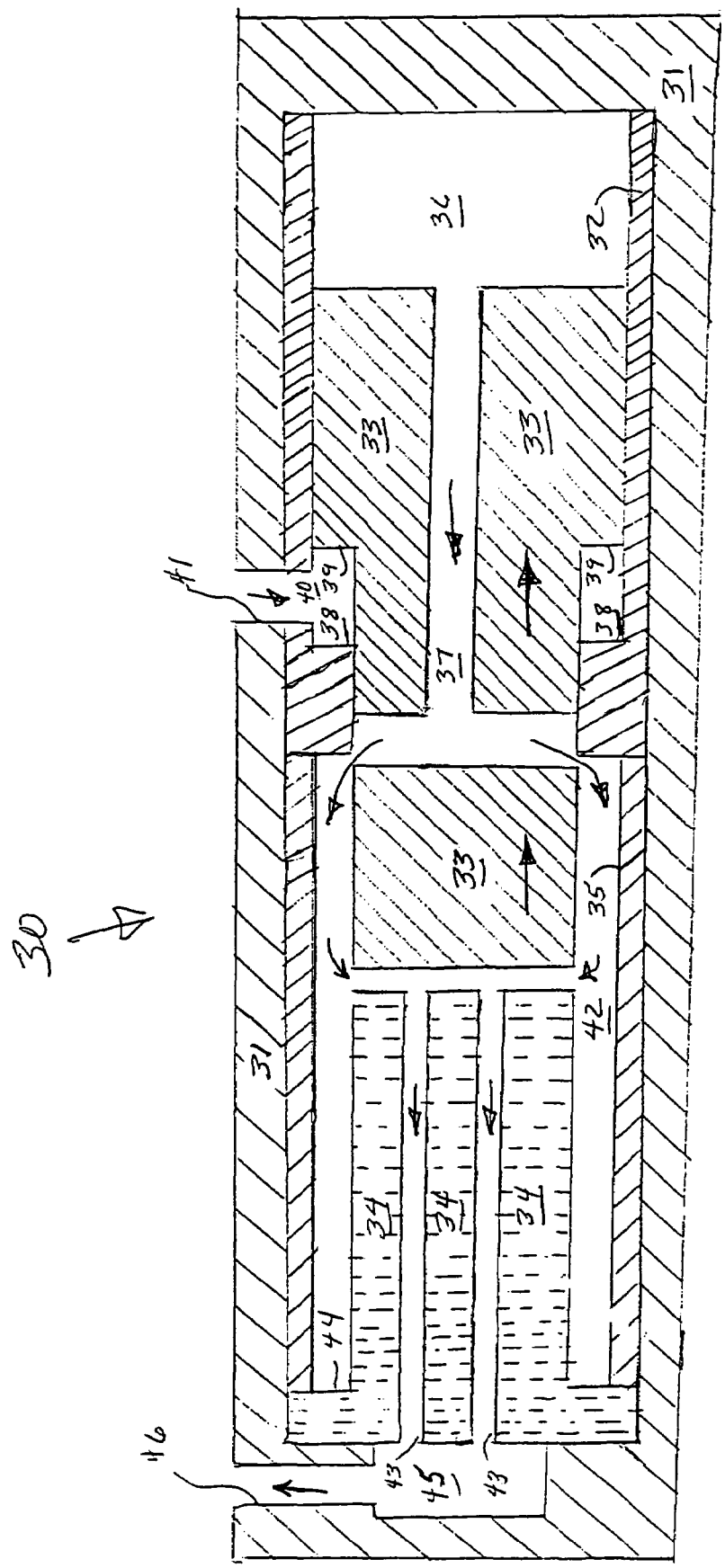
FIG. 4B shows the fourth embodiment with the driver piston in a second position.

A fourth embodiment 30 of the invention is shown in FIGS. 4A and 4B. This embodiment comprises a housing 31 having a thrust end containing a cylinder 32 and a piston 33 and having a programmer end containing a programmer body 34 and a spacer 35. The space inside cylinder 31 between piston 33 and the closed thrust end of housing 31 comprises a primary thrust chamber 36. Cylinder 32 and piston 33 each have a step in diameter indicated by annular surfaces 38 and 39 respectively. The annular space bounded by the smaller diameter of piston 33, the larger diameter of cylinder 32 and the annular surfaces 38 and 39 comprises a secondary thrust chamber 40. A passage 37 through piston 33 connects primary chamber 36 to an opening on the smaller diameter of piston 33. An inlet port 41 through housing 31 and cylinder 32 permits connecting secondary thrust chamber 40 to an external gas source (not shown). The preferably cylindrical programmer block 34 is located axially with respect to cylinder 32 within a programmer chamber 42 in the programmer end of housing 31. Block 34 has a flange 44 which is held against the programmer end of housing 31 by spacer 35. The programmer end of housing 31 contains an exhaust cavity 45 connected through an exhaust port 46 to an external exhaust system (not shown). Block 34 contains multiple internal cooling passages 43 connecting programmer cavity 42 to exhaust cavity 45.

In operation, with piston 33 near the thrust end of cylinder 32 as shown in FIG. 4A, compressed gas enters inlet port 41 and passes through secondary thrust chamber 40 and passage 37 to primary thrust chamber 36. The gas pressure in the primary thrust chamber, acting on the large piston area, produces sufficient force to overcome the force produced by the pressure acting on the smaller annular area 39 and to accelerate the piston toward the programmer end of the housing. The piston continues to accelerate as the programmer end of passage 37 is closed by entering the smaller diameter of the cylinder. When the programmer end of passage 37 reaches the end of cylinder 32, as shown in FIG. 4B, the compressed gas in the primary thrust chamber is released through passage 37 into cavity 42. The gas then passes through the cooling passages 43 in block 34 and escapes through exhaust cavity 45 and exhaust port 46. Piston 33 continues on its own momentum and impacts programmer block 34. The force impulse produced by the impact is shaped by the programmer block and transferred through the housing to its destination. After the impact, the piston rebounds and is returned to its initial position as shown in FIG. 4A by gas pressure acting on annular surface 39. The cycle then repeats as long as gas pressure is applied to inlet the port. The process thereby produces a series of force impulses applied to the housing.

Two types of programmer blocks can be used in vibrator 30. The preferred material for use in programmer blocks is an elastomer although other materials having the desired elastic and damping properties can be used.

Figure 5:
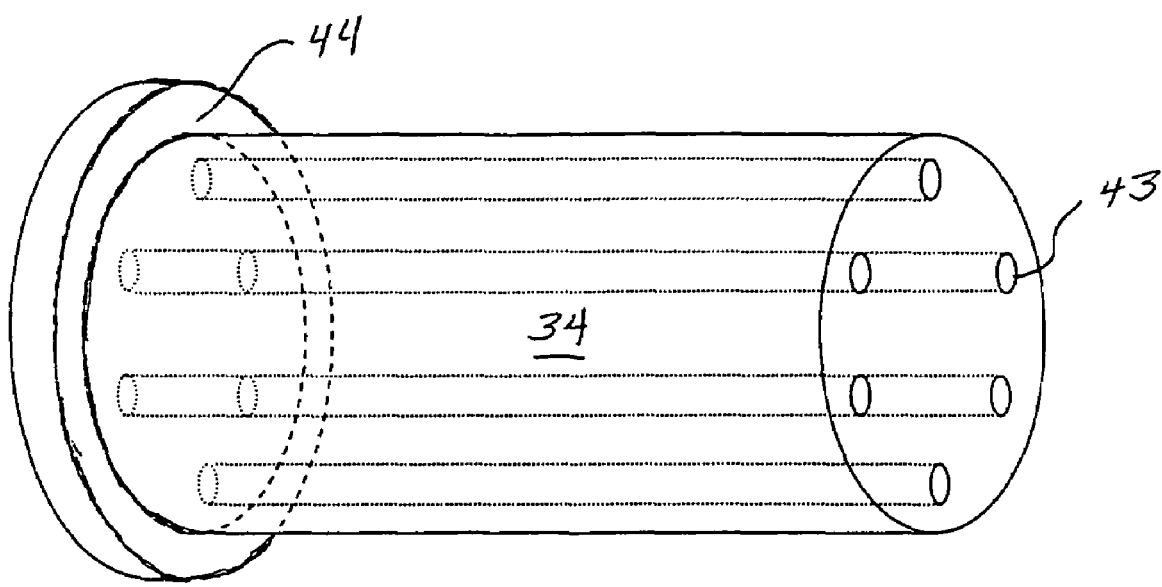
FIG. 5 is a perspective view of a first type of programmer block.

A perspective view of the block 34, shown in cross section in FIGS. 4A and 4B, is shown in FIG. 5. This figure shows the block 34 with its cooling passages 43 and flange 44. Upon impact by the piston, block 43 is axially compressed and acts to shape the force impulse applied to the housing. The shape, material and density of the block and piston, along with the dynamically variable fluid parameters, can be altered to obtain the desired force impulse.

Figure 6:
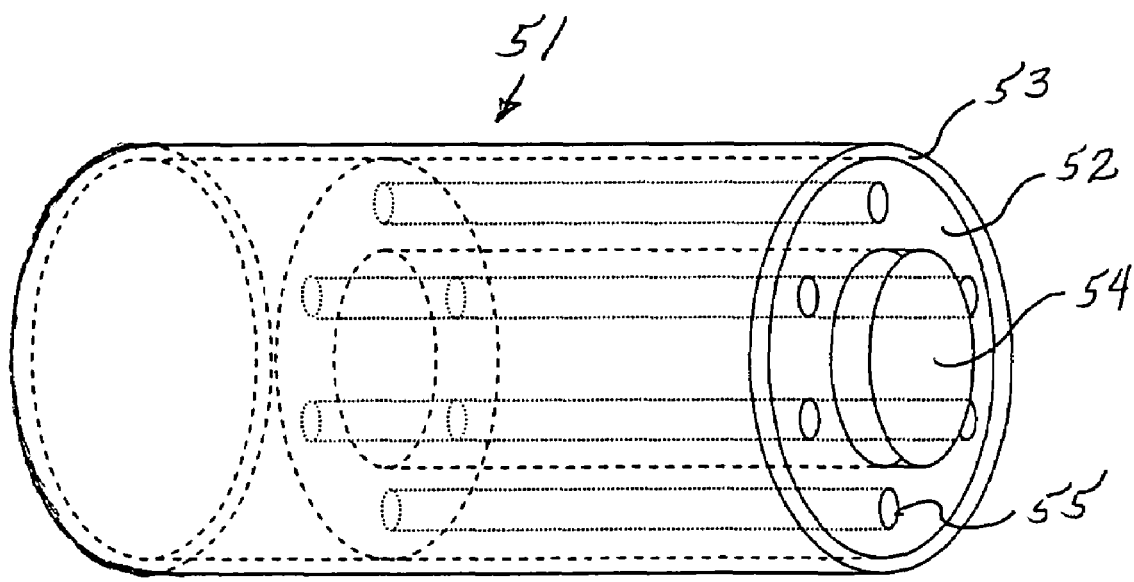
FIG. 6 is a perspective view of a second type of programmer block.

An alternative to block 34 is shown as block assembly 51 in the perspective view of FIG. 6. Assembly 51 comprises a cylindrical programmer block 52 contained within and bonded to a preferably rigid hollow outer cylinder 53. A preferably rigid inner cylinder 54 is contained within and bonded to block 52. Multiple cooling passages 55 run through the length of block 52 between the inner and outer cylinders. Assembly 51 replaces programmer block 34 and spacer 35 in FIGS. 4A and 4B.

Assembly 51 can be used as an alternative to block 34 to extend the life of the programmer material. Elastomers tend to fail sooner when repeatedly stressed in compression than when stressed in shear. In assembly 51, the impact forces applied to the programmer block are shearing forces instead of the compression forces applied to block 34.

A fifth embodiment 50 of the invention is shown in FIG. 4C. In this embodiment, the programmer block 34 of FIGS. 4A-B is replaced by a cup-shaped piston 47 and spring 48 as in the third embodiment shown in FIG. 3. Piston 47 contains vent holes 49 which allow exhaust gas to pass through the piston. The spacer 35 of FIGS. 4A-B is replaced with a spacer 56 having piston stops 57 to limit the travel of piston 47. As in the description of alternative designs of for piston 24 of FIG. 3, piston 47 can also have various shapes obvious to one of ordinary skill in the art.

In all the embodiments, the kinetic energy of the driver piston at impact with the programmer device affects the magnitude and shape of the force impulse. A driver piston made of a heavy metal can be used to increase the impact energy. Tungsten is a metal especially appropriate for use in a driver piston because of its relatively high mass density and its durability.

FIG. 7 shows exemplary fluid supplies and port connections to a vibrator. A pneumatic gas supply 60 is connected via accumulators 61 and 62 to inlet ports 17 and 19 of vibrator 10 of FIGS. 2-2B. An exhaust system (not shown) is connected to exhaust port 18. Fluid supplies 63 and 66 are connected via accumulators 64 and 65 to programmer ports 21 and 22. The pneumatic and fluid supplies, along with their associated accumulators, are chosen and sized to obtain the force impulse shapes and repetition rates desired. The supplies can be adjusted during operation of the vibrator to dynamically program the vibrator. The number of supplies and accumulators are chosen to match the needs of the vibrators in use. For example, multiple vibrators can be supplied from a single source or both inlet ports of a single vibrator can share one accumulator.

FIG. 8 shows exemplary fluid supplies and port connections for a different vibrator such as vibrator 30 of FIGS. 4A-4B. Since this vibrator has a single inlet port and no programmer port, only one pneumatic supply and one optional accumulator is needed. As previously described, these components are chosen and adjusted to obtain the desired impulse shapes and repetition rates.

Various techniques for utilizing pneumatic gas sources, accumulators and port connections to vary the magnitudes and repetition rates of vibrators are described in FIGS. 6B-7C and Columns 10-12 of U.S. Pat. No. 5,365,788 incorporated herein by reference in its entirety.

The invention illustratively described herein suitably may be practiced in the absence of any element or elements, limitation or limitations which is not specifically disclosed herein.

All references cited herein are hereby incorporated by reference to the extent that there is no inconsistency with the disclosure of this specification. Some references provided herein are incorporated by reference to provide details concerning additional materials, additional methods of analysis and additional uses of the invention.

Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

One of ordinary skill in the art will appreciate that materials, device elements, and analytical methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art. For example, when a compound is claimed, it should be understood that compounds known in the art including the compounds disclosed in the references disclosed herein are not intended to be included in the claim.

What is claimed is:

1. A programmable pneumatic vibrator for generating a series of force impulses whose frequency, duration, magnitude and shape can be statically and dynamically controlled, comprising:
    a housing comprising a driver cylinder containing a driver piston;
    a port system connected to said driver cylinder for causing said driver piston to reciprocate axially within said driver cylinder when connected to a pressurized gas supply; and
    a programmer device contained within said housing axially adjacent to said driver cylinder for receiving impacts from said driver piston.

2. A vibrator as in claim 1 wherein said driver piston comprises a heavy metal.

3. A vibrator as in claim 2 wherein said heavy metal is tungsten.

4. A vibrator as in claim 1 wherein said programmer device comprises a programmer piston within a programmer cylinder.

5. A vibrator as in claim 4 wherein said programmer cylinder has a closed end with a programmer port therein.

6. A vibrator as in claim 5 wherein said programmer cylinder and said programmer piston further comprise a programmer chamber containing a fluid.

7. A vibrator as in claim 6 wherein said fluid is supplied through said programmer port from an external source.

8. A vibrator as in claim 5 wherein said programmer port has a conical section.

9. A vibrator as in claim 4 wherein said programmer cylinder contains a spring.

10. A vibrator as in claim 4 wherein said programmer piston comprises a resilient material.

11. A vibrator as in claim 10 wherein said resilient material is an elastomer.

12. A vibrator as in claim 1 comprising two of said programmer devices, one axially adjacent to each end of said driver cylinder.

13. A vibrator as in claim 1 wherein said programmer device comprises a spring.

14. A vibrator as in claim 1 wherein said programmer device is a block comprising a resilient material.

15. A vibrator as in claim 14 wherein said block contains cooling passages.

16. A vibrator as in claim 15 further comprising a port and passage system for directing exhaust gas from said driver cylinder through said cooling passages.

17. A vibrator as in claim 14 wherein said resilient material is an elastomer.

18. A vibrator as in claim 14 wherein said impacts produce compression stresses in said resilient material.

19. A vibrator as in claim 14 wherein said impacts produce shear stresses in said resilient material.

20. A vibrator as in claim 19 further comprising a cylindrical programmer block contained within and bonded to a hollow outer cylinder and further comprising an inner cylinder contained within and bonded to said cylindrical block.

21. A vibrator as in claim 20 wherein said cylindrical programmer block contains cooling passages running the length of said cylindrical programmer block between said inner cylinder and said outer cylinder.

22. A vibrator as in claim 20 wherein said impacts are applied to said inner cylinder.

23. A method for generating and shaping a series of force impulses for application to a load, comprising the steps of:
    providing at least one vibrator of claim 1;
    mechanically coupling the at least one vibrator to the load; and
    selecting, varying or both one or more of the following parameters to shape the force impulses wherein the parameters that are selected varied or both are selected from the group of parameters consisting of:
        the geometry of one or more components of the at least one vibrator, the materials from which one or more components of the at least one vibrator are made, the materials from which the programmer device of the at least one vibrator is made; the materials from which the piston of the at least one vibrator is made; the materials from which the driver cylinder of the at least one vibrator is made; the type of pressurized gas supplied; the pressure of the pressurized gas supplied; and the temperature of the pressurized gas supplied.

24. The method of claim 23 wherein the programmer device of a vibrator of the at least one vibrators further comprises a programmer cylinder containing a fluid, wherein the type of fluid, the pressure of the fluid, the viscosity of the fluid, the temperature of the fluid, the amount of the fluid or any combinations thereof is selected, varied or both to shape the force impulses.

25. The method of claim 24 wherein the programmer device further comprises a programmer piston within the programmer cylinder and at least one programmer port in the port system, wherein the geometry of the at least one programmer port, the smoothness or roughness of the surface of the at least one programmer port, the size, shape or both of the at least one programmer port, or any combinations thereof is selected, varied or both to shape the force impulses.

26. The method of claim 23 wherein a vibrator of the at least one vibrators further comprises a programmer device which is a block comprising a resilient material, wherein the geometry of the block, the type and amount of materials from which the block is made, or combinations thereof is selected, varied or both to shape the force impulses.

27. The method of claim 26 wherein the resilient material is a spring.

28. The method of claim 23 wherein the programmer device comprises a programmer piston within a programmer cylinder and at least one programmer port of the port system, wherein the geometry of the at least one programmer port, the smoothness or roughness of the surface of the at least one port, the size, shape or both of the at least one port, or any combinations thereof is selected, varied or both to shape the force impulses.

29. A vibrator as in claim 1 wherein the drive cylinder is a hollow cylinder having first and second closed ends and first, second and third segments; wherein the drive piston is contained within said hollow cylinder adjacent to said first closed end; wherein said programmer device comprises a programmer piston contained within said hollow cylinder adjacent to said second end and further comprising:

a first thrust chamber bounded by said driver piston, said first closed end and said first segment of said hollow cylinder;

a second thrust chamber bounded by said driver piston, said programmer piston and said second segment of said hollow cylinder;

a programmer chamber bounded by said programmer piston, said second closed end and said third segment of said hollow cylinder;

an inlet port opening into a side of said hollow cylinder;

an exhaust port opening into a side of said hollow cylinder;

a first passage within said driver piston, said first passage adapted for alternately connecting said first thrust chamber to said inlet port or said exhaust port;

a second passage within said driver piston, said second passage adapted for alternately connecting said second thrust chamber to said inlet port or said exhaust port; and a programmer port opening through said second closed end into said programmer chamber.

30. A vibrator as in claim 1 wherein the drive cylinder is a hollow cylinder having first and second closed ends and first, second, third and fourth segments; wherein the drive piston is contained within said hollow cylinder; wherein said programmer device comprises a first and a second programmer piston contained within said hollow cylinder; wherein said drive piston is contained within said hollow cylinder between said first and second programmer pistons; and further comprising:

a first programmer chamber bounded by said first programmer piston, said first closed end and said first segment of said hollow cylinder;

a second programmer chamber bounded by said second programmer piston, said second closed end and said second segment of said hollow cylinder;

a first thrust chamber bounded by said driver piston, said first closed end and said third segment of said hollow cylinder;

a second thrust chamber bounded by said driver piston, said second programmer piston and said fourth segment of said hollow cylinder;

an inlet port opening into a side of said hollow cylinder;

an exhaust port opening into a side of said hollow cylinder;

a first passage within said driver piston, said first passage adapted for alternately connecting said first thrust chamber to said inlet port or said exhaust port;

a second passage within said driver piston, said second passage adapted for alternately connecting said second thrust chamber to said inlet port or said exhaust port;

a first programmer port opening into said first programmer chamber; and a second programmer port opening into said second programmer chamber.

31. The vibrator of claim 1 wherein the drive cylinder comprises first and second contiguous coaxial hollow cylinders, said first coaxial hollow cylinder having a larger diameter than said second coaxial hollow cylinder said first and second coaxial hollow cylinders each having a closed end; wherein said drive piston comprises first and second contiguous coaxial piston segments fitted to, and contained within, said first and second coaxial hollow cylinders; wherein said programmer device comprise a programmer block; and said vibrator further comprises:

a programmer chamber adjacent to the closed end of said second coaxial hollow cylinder;

a first thrust chamber bounded by said first piston, said first coaxial hollow cylinder and the closed end of said first coaxial hollow cylinder;

a first annular surface between said first and second coaxial hollow cylinders;

a second annular surface between said first and second coaxial piston segments of said drive piston;

a second thrust chamber bounded by said first coaxial hollow cylinder, said first annular surface, said second coaxial piston segment of said drive piston and said second annular surface;

an inlet port opening from outside of said first coaxial hollow cylinder into said second thrust chamber;

a passage within said driver piston, said passage connecting said first thrust chamber to an opening in the circumferential surface of said second coaxial piston segment of said drive piston; and an exhaust port opening from said programmer chamber through said housing, and wherein said programmer block is contained within said programmer chamber and is located axially adjacent to said first and second coaxial hollow cylinders for receiving impacts from said driver piston.

32. The vibrator as in claim 31 wherein the programmer block contains passages for passing a cooling fluid.

33. The vibrator as in claim 31 wherein the programmer block is made of a resilient material.

34. The vibrator as in claim 33 wherein the resilient material is an elastomer.

35. A shaker table which comprises a plurality of vibrators of claim 1 wherein the vibrators are attached to the shaker table with different orientations to provide multi-axial vibrations to the table.

* * * * *